(12) United States Patent
Young et al.

(10) Patent No.: US 6,434,644 B1
(45) Date of Patent: Aug. 13, 2002

(54) COMMUNICATION SYSTEM AND METHOD FOR INTERFACING DIFFERING COMMUNICATION STANDARDS

(75) Inventors: Bruce Young, Le Mars, IA (US); Corwyn Richard Meyer, Sioux Falls, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/587,408

(22) Filed: Jun. 5, 2000

Related U.S. Application Data

(63) Continuation of application No. 09/099,876, filed on Jun. 19, 1998.

(51) Int. Cl.$^7$ .............................. B06F 3/00; B06F 13/00
(52) U.S. Cl. .............................. 710/63; 710/62; 710/64; 701/24
(58) Field of Search .............................. 710/62, 63, 64; 701/24

(56) References Cited

U.S. PATENT DOCUMENTS

| | | | | |
|---|---|---|---|---|
| 5,784,581 A | * | 7/1998 | Hannah ...................... | 710/110 |
| 5,890,015 A | * | 3/1999 | Garney et al. ................ | 710/62 |
| 5,935,224 A | * | 8/1999 | Svancarek et al. ............ | 710/63 |
| 5,995,884 A | * | 11/1999 | Allen et al. .................... | 701/24 |
| 6,040,792 A | * | 3/2000 | Watson et al. .............. | 341/100 |
| 6,064,299 A | * | 5/2000 | Lesesky et al. ............. | 340/431 |
| 6,084,638 A | * | 7/2000 | Hare et al. .................. | 348/552 |

OTHER PUBLICATIONS

Business Wire, Title: USB Serial Converter Connects Legacy Peripheral Hardware to New Generation of PCs, Feb. 9, 1998, Feb. 23, 1998, Feb. 24, 1998.*

* cited by examiner

*Primary Examiner*—Jeffrey Gaffin
*Assistant Examiner*—Tammara Peyton
(74) *Attorney, Agent, or Firm*—Walter Malinowski; Mark S. Walker; Suiter & Associates

(57) ABSTRACT

A system and method for communicating information between an information handling system and a peripheral device of the information handling system are disclosed. A processor is coupled to a bus for carrying information provided by the processor, and a host controller coupled to the bus receives the information and sends the information to the peripheral device according to a first communications standard. A peripheral device controller coupled to the host controller converts the information from the first communications standard to a second communications standard and transmits the information to the peripheral device in accordance with the second communications standard interpretable by the peripheral device. Control information is generated and sent to a peripheral device controller according to a first communications standard. The control information is converted from the first communication standard to a second communication standard and transmitted to the peripheral. The peripheral device receives and interprets the control information and executes a control function.

43 Claims, 4 Drawing Sheets

COMMUNICATION SYSTEM AND METHOD FOR INTERFACING DIFFERING COMMUNICATION STANDARDS

CROSS-REFERENCE TO RELATED APPLICATIONS

The present application is a continuation of prior application Ser. No. 09/099,876 filed Jun. 19, 1998 (pending).

FIELD OF THE INVENTION

The present invention generally relates to the field of information handling systems, and particularly to a system and method for communicating with an information handling system.

BACKGROUND OF THE INVENTION

In the art of information handling systems, it is desirable to provide open architecture designs for information handling systems in which the specifications are published and available to all hardware and software developers, many of whom being direct competitors. The advantage of open architecture designs over closed architecture designs in which specifications are proprietary or otherwise not freely available is that no single company alone must bear the burden and costs of the infrastructure and research and development of the information handling system design. Thus, third parties are allowed to independently develop hardware enhancements and peripheral devices. The open-architecture design of die International Business Machines (IBM) compatible personal computer architecture contributed significantly to its present dominance in the computer industry.

However, a disadvantage of open architecture information handling systems is that new design standards are continually developed that are incompatible with previous standards. Further, since no single company or organization controls design standards, and since incompatible standards are often promulgated by competing companies, each vying to become the de facto industry standard, hardware devices developed for one standard risk becoming useless or obsolete if a different standard is adopted by the industry. Further, the hardware devices of presently existing devices must be redesigned to be compatible with newly adopted industry standards requiring further time and resources.

For example, Recommended Standard 232 (RS-232) promulgated by the Electrical Industries Association is a commonly implemented standard for serial communications in an information handling system. However, the Universal Serial Bus (USB) is a recently promulgated serial bus design standard for connecting peripherals to an information handling system. Thus, preexisting, or legacy, devices and the information handling systems for controlling such devices are typically designed in compliance with RS-232 standards and therefore may be incompatible with information handling systems that incorporate a USB standard bus. It would be therefore highly desirable to be able to utilize a hardware device such as a legacy device designed according to a first standard with an information handling system that implements a second standard differing from the first standard.

SUMMARY OF THE INVENTION

The present invention is directed to a system for communicating information between an information handling system and a peripheral device of the information handling system. In one embodiment, the system includes a processor for executing instructions on the information handling system, the processor being coupled to a bus for carrying information provided by the processor, a host controller coupled to the bus for receiving the information and for sending the information to the peripheral device according to a first communications standard, and a peripheral device controller coupled to the host controller for converting the information from the first communications standard to a second communications standard and for transmitting the information to the peripheral device in accordance with the second communications standard, the second communications standard being interpretable by the peripheral device.

The present invention is further directed to, in an information handling system, a method for communicating with a peripheral device with a first communication standard wherein the peripheral device interprets information according to a second communication standard differing from the first communications standard. In one embodiment of the invention, the method includes steps for generating control information for controlling the peripheral device, sending the control information to a peripheral device controller according to a first communications standard, converting the control information from the first communication standard to the second communication standard, the control information in the second communication standard being interpretable by the peripheral device, and transmitting the converted control information to the peripheral device according to the second communication standard whereby the peripheral device receives and interprets the control information and executes a control function in response thereto.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
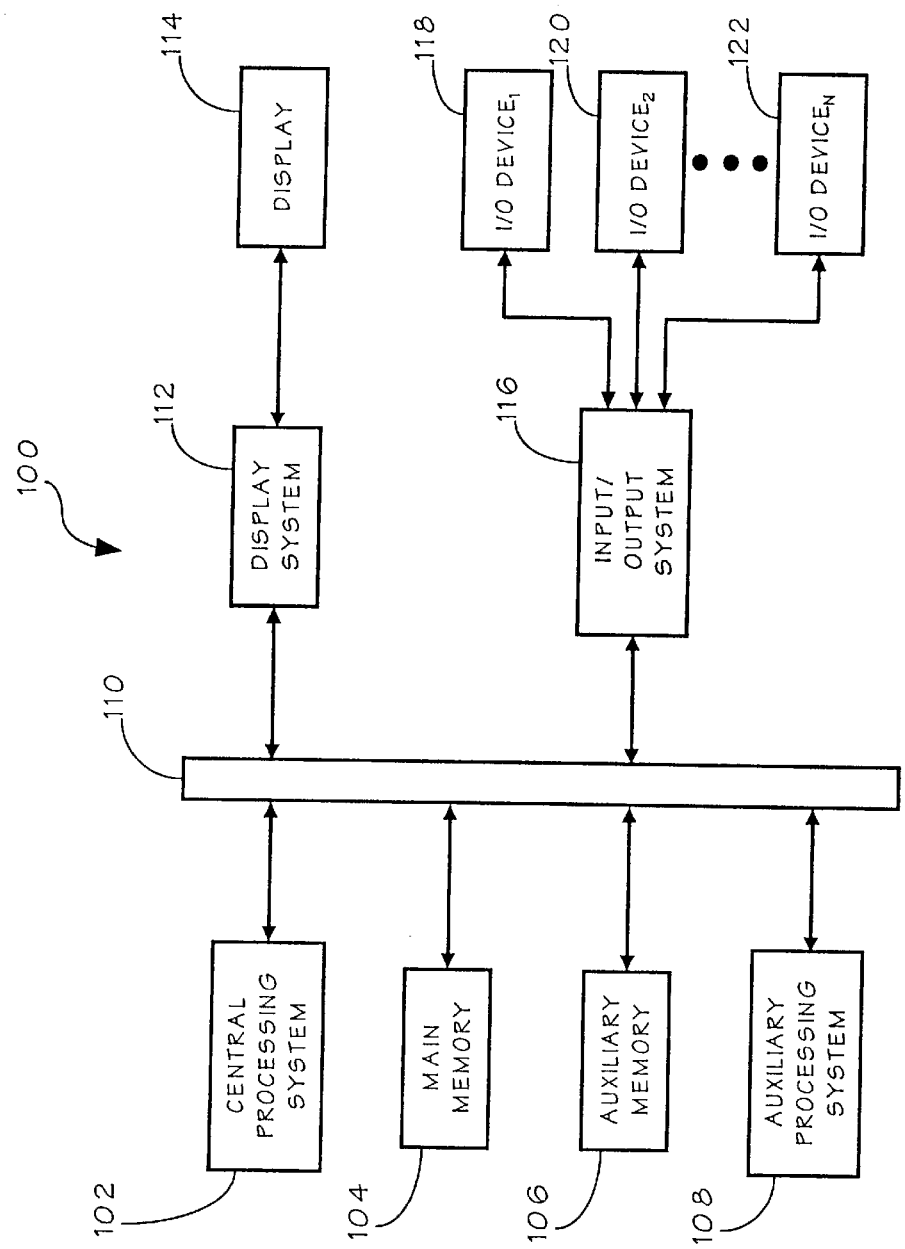
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processing system 102 controls the information handling system 100. Central processing system 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processing system 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of information handling system 100 include main memory 104, auxiliary memory 106, and an auxiliary processing system 108 as required. Main memory 104 provides storage of instructions and data for programs executing on central processing system 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a 10 gas or plasma display. Input/output system 116 may comprise one or more controllers or adapters for providing interface functions between one or more of I/O devices 118-122. For example, input/output system 116 may comprise a serial port, parallel port, infrared port, network adapter, printer adapter, radio frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between information handling system 100 of the present invention and external devices, networks, or information sources. Input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. I by one having ordinary skill in the art would not depart from the scope or the spirit of the present invention.

Figure 2:
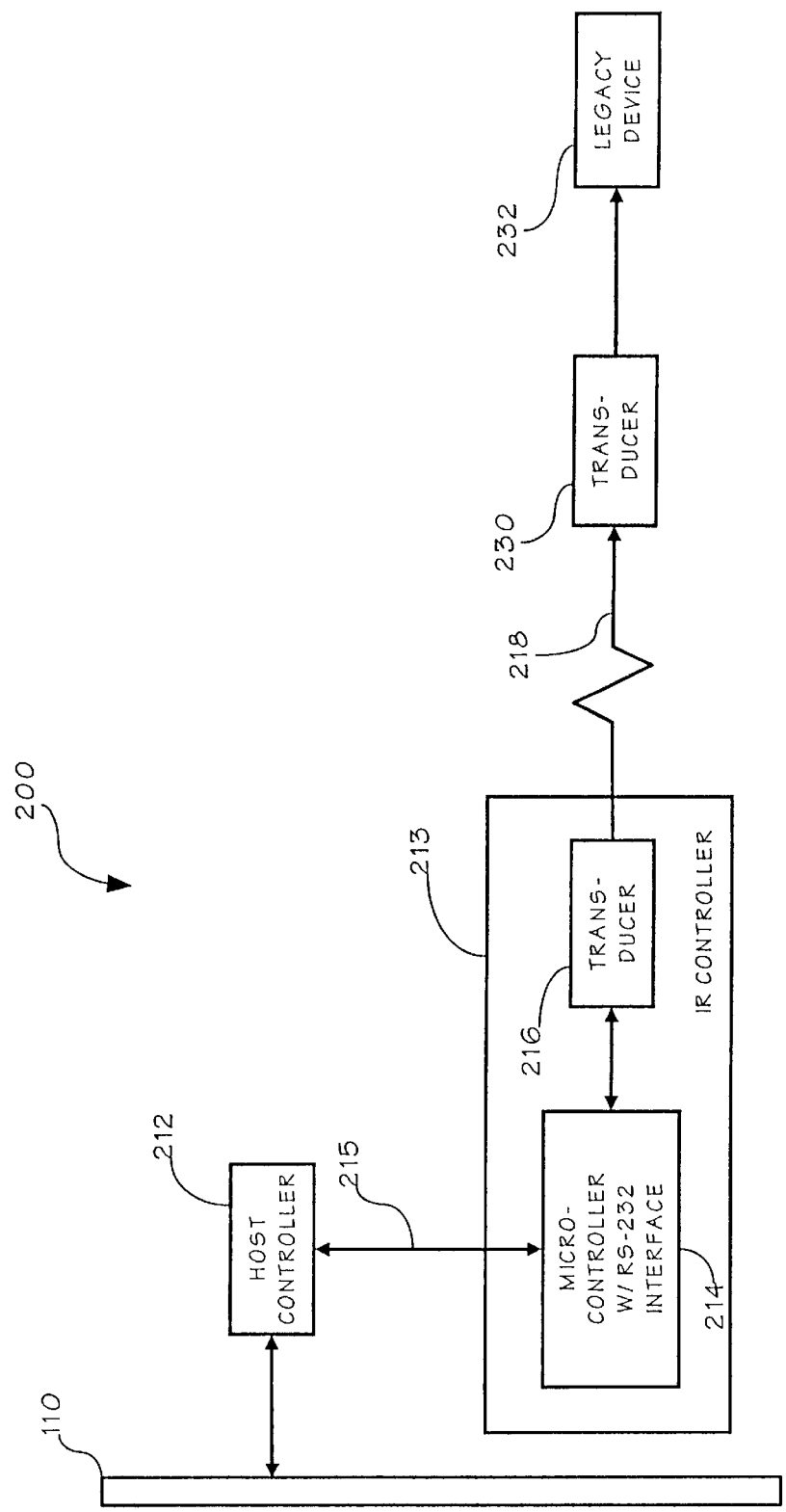
FIG. 2 is a block diagram of a system in which a peripheral device is adapted to operate with a system bus in compliance with a bus communications standard in accordance with the present invention.

Referring now to FIG. 2 a system in which a peripheral device in compliance with a first communications standard is adapted to operate with a system bus in compliance with a second communications standard in accordance with the present invention will be discussed. The system 200 includes a system bus 110 of information handling system 100 for transferring data among the hardware components of information handling system 100. Bus 110 includes groups of communications lines that carry data, address, and control information. A host controller 212 couples to bus 110 and provides an interface between devices in compliance with the standard to which bus 110 is designed. For example, host controller 212 receives information in the form of bus signals from bus 110 and may provide a serial output signal 215 formatted in compliance with an RS-232 standard, thereby implementing an RS-232 serial port. An infrared (IR) controller 213 couples to the RS-232 serial port output 215 of host controller 212 for providing control signals for controlling a peripheral device such as a legacy device 232 with information handling system 100 with signals sent to host controller 212 via bus 110. Legacy device 232 may be, for example, a commercially available audio or audio/visual device (e.g., VCR, audio amplifier, laser disc player, DVD player, etc.). Legacy devices such as legacy device 232 typically utilize IR control codes that are manufacturer specific since no true industry control code standard exists. For example, some legacy devices utilize the REC-80 IR control code developed by Panasonic Corporation while others utilize the RC-5 code developed by Philips Electronics N.V. Furthermore, legacy device manufacturers typically do not utilize infrared protocols that are standard in the personal computer industry such as the IrDA standard promulgated by the Infrared Data Association.

IR controller 213, therefore, includes a microcontroller 214 having an RS-232 interface that couples to host controller 212 to provide an interface between devices which operate in compliance with legacy device IR code standards and bus 110. Microcontroller 214 provides IR control codes to an infrared transducer 216 for transmitting the IR control codes as an infrared signal 218 to legacy device 232. Transducer 230 converts information signals received from transducer 216 into a form readable by legacy device 232.

Bus 110 may be compliant with any promulgated industry standard. For example, bus 110 may be designed in compliance with any of the following bus architectures: Industry Standard Architecture (ISA), Extended Industry Standard Architecture (EISA), Micro Channel Architecture, or Peripheral Component Interconnect (PCI), for example. Normally, an input/output device designed in compliance with the standard to which bus 110 is designed directly connects to host controller 212. However, since legacy device 232 is designed to a standard that differs from the standard to which bus 110 is designed, microcontroller 214 is utilized to provide an interface between legacy device 232 and host controller 212.

Further, communications medium 218 may be a wireless medium such that legacy device 232 may be operated at a remote location away from information handling system 100 in which bus 110, host controller 212, serial controller 214 and transducer 216 are disposed. For example, communication medium 218 may be a radio frequency (RF) or infrared (IR) communication medium wherein information signals are transmitted between from microcontroller 214 to legacy device 232 as electromagnetic waves having RF or IR wavelengths, respectively. In the case of a typical legacy device 232, transducer 230 is a receiver and transducer 216 is a transmitter.

Figure 3:
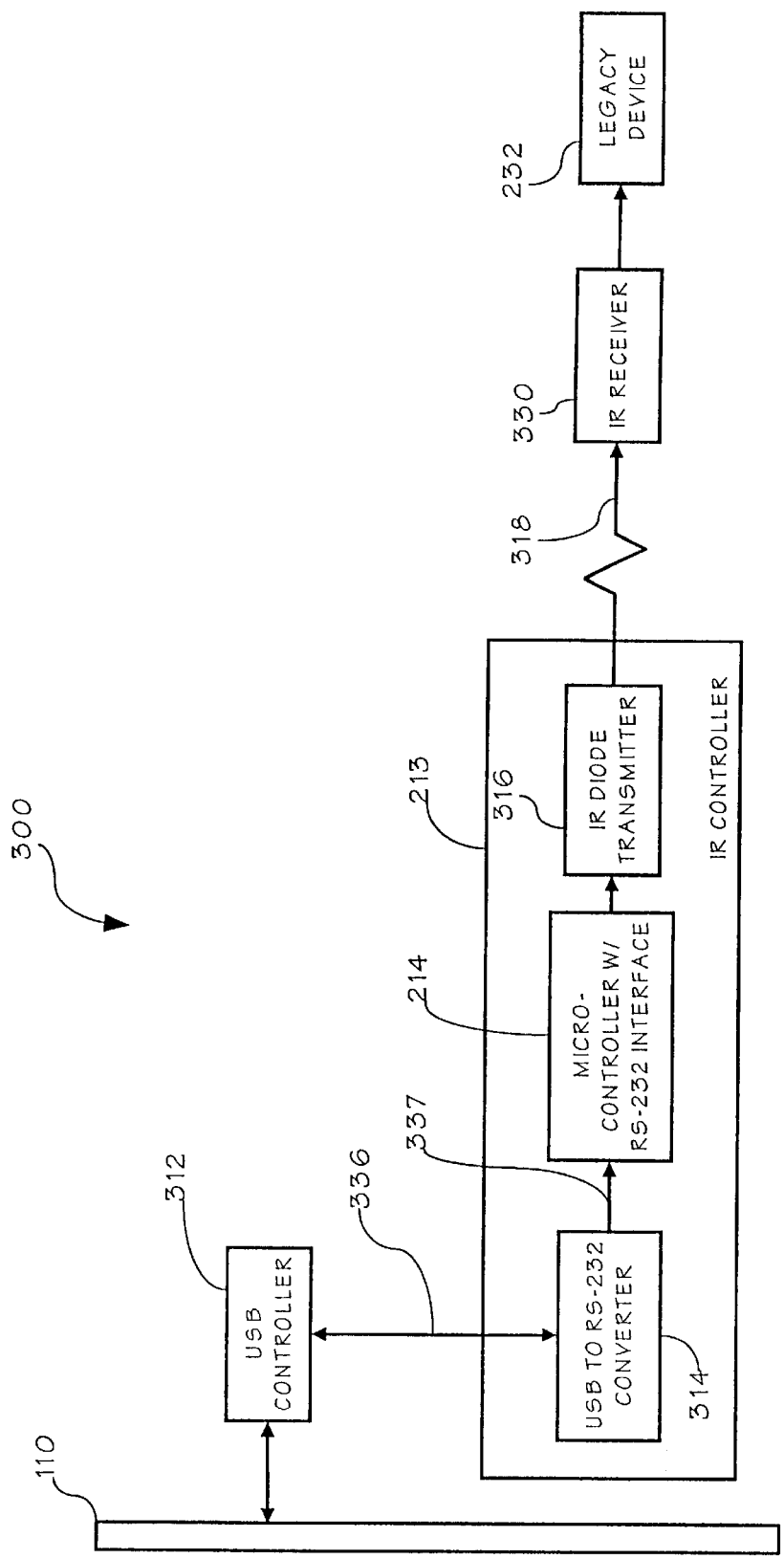
FIG. 3 is a block diagram of a system in which a peripheral device designed to receive information transmitted in an infrared communications standard is adapted to operate with a system bus in compliance with a bus communications standard in accordance with the present invention.

Referring now to FIG. 3, a system in which the infrared controller of FIG. 2 is adapted to operate with a system bus in compliance with the Universal Serial Bus communications standard in accordance with the present invention will be discussed. The system 300 includes bus 110 coupled to a USB controller 312. USB controller 312 in turn is coupled to a USB to RS-232 converter 314 implemented in IR controller 213. Legacy device 232 receives signals from an infrared receiver 330 for receiving information transmitted via an infrared signal 318 generated from information handling system 100. An infrared diode transmitter 316 couples to legacy device 232 via infrared signals 318. IR diode transmitter 316 sends the infrared signals 318 from IR controller 213. IR controller 213 is typically referred to as an IR blaster since it transmits or "blasts" IR signals 318 to a remotely disposed legacy device 232.

USB controller 312 receives bus signals from bus 110 and provides a USB formatted output signal 336 to IR controller 213. The USB formatted signal 336 is received by a USB to RS-232 converter included in IR controller 213 and is converted from a USB communications format to an RS-232 communications format so that microcontroller 214 may convert the signals from RS-232 format to the control code format interpretable by legacy device 232. Thus, microcontroller 214 may be controlled with signals formatted in accordance with a first communications standard (e.g., USB) wherein microcontroller 214 is designed to interpret signals formatted in accordance with a second communications standard (e.g., RS-232 ). USB to RS-232 converter 337 may be implemented as a hardware device having specific circuitry designed to implement the conversion function, or may be a software routine stored in a read-only memory (i.e. firmware), or may be a software program running on central processing system 102 or IR controller 213.

Figure 4:
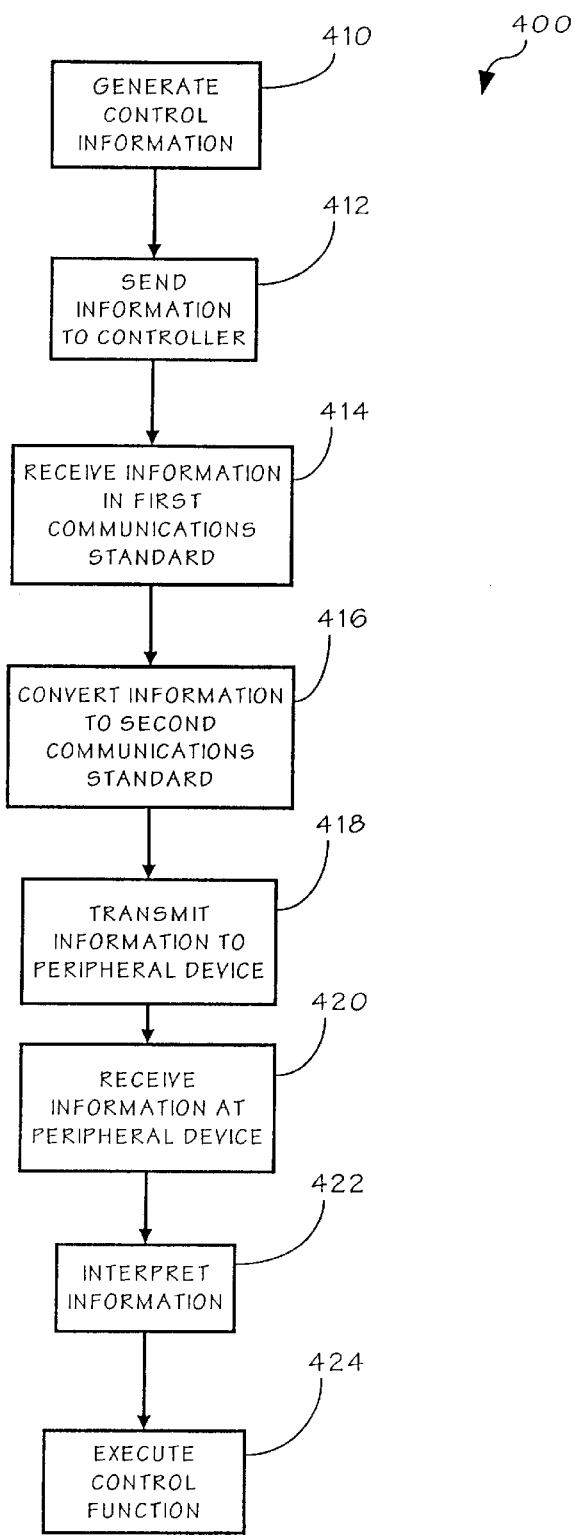
FIG. 4 is a flow diagram illustrating a method for communicating with a peripheral device with control information sent according to a first communications standard wherein the peripheral device interprets information according to a second communications standard in accordance with the present invention.

Referring now to FIG. 4, a flow diagram illustrating a method for communication between devices using differing communications protocols will be discussed. The method 400 begins when a information handling system 100 generates control information at step 410 for a peripheral device such as legacy device 232 (e.g., VCR, laser disc player, audio amplifier, etc.). The control information may be generated, or example, by a program of instructions executed by central processing system 102, or by a command entered by a user into information handling system 100 via input/output device 122 through input/output system 116. The control information is sent at step 412 in compliance with a first communications standard to a device controller, for example IR controller 213, via bus 110. The control information is received at step 414 by the device controller according to the first communication standard. The first communication standard may be, for example, an RS-232 or USB communications standard. The received control information is then converted from the first communication standard to a second communication standard at step 416. The information formatted according to the second communication standard is interpretable as a control command by the peripheral device. Typically, the second communication standard is a standard specific to the manufacturer of the peripheral device. These manufacturer specific codes may be stored on the peripheral device controller (e.g., as firmware) such that the peripheral device controller may receive control information according to the first communication standard or protocol and convert the control information or generate the control information in a form interpretable by the peripheral, or legacy, device. The control information is then transmitted at step 418 to the peripheral device in accordance with the second communications format or protocol whereupon the information is received by the peripheral device at step 420. The information may be transmitted via a direct communications link (e.g., wire or fiber optic cable) or via a wireless communications link (e.g., infrared or radio frequency data transmission.) The peripheral device interprets the received information at step 422 and executes the control function indicated by the control information at step 424 (e.g., "play", "stop", "increase/decrease volume", etc.).

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the communication system and method for interfacing differing communication standards of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A system for communicating information between an information handling system and a peripheral device of the information handling system, comprising:
    a processor for executing instructions on the information handling system, said processor being coupled to a bus for carrying information provided by said processor;
    a host controller coupled to said bus for receiving the information and for sending the information to the a peripheral device according to a first digital communications standard; and
    a digital peripheral device controller coupled to the bus via said host controller for converting information from the first digital communications standard to the peripheral device as a digital control in accordance with the second digital communications standard, the second digital communications standard being interpretable by the peripheral device,
    the peripheral device being a legacy device having a manufacturer specific infrared control code.

2. A system as claimed in claim 1, said digital peripheral device controller comprising an infrared controller.

3. A system as claimed in claim 1, said digital peripheral device controller comprising a microcontroller having a serial port interface for generating control information for the peripheral device, and a transducer coupled to said microcontroller for transmitting the control information to the peripheral device.

4. A system as claimed in claim 3, the serial port interface being in compliance with an RS-232 standard.

5. A system as claimed in claim 1, the first digital communications standard being a serial communications standard.

6. A system as claimed in claim 5, the serial communications standard being in compliance with RS-232 standards.

7. A system as claimed in claim 1, the second digital communications standard being an infrared communications standard.

8. A system as claimed in claim 1, the second digital communications standard being a radio frequency standard.

9. A system as claimed in claim 1, said host controller being a USB controller.

10. A system as claimed in claim 1, the first digital communications standard being in compliance with a USB standard.

11. A system as claimed in claim 1, said digital peripheral device controller comprising a microcontroller having a serial communications interface for generating control information for the peripheral device, a converter, coupled between said host controller and said microcontroller, for converting the information from the first communications standard to the second communications standard, and a transducer coupled to said microcontroller for transmitting the control information to the peripheral device according to the second communication standard.

12. A system as claimed in claim 11, said host controller being a USB controller, the serial communications interface of said microcontroller being in compliance with an RS-232 standard, and said converter being a USB to RS-232 converter.

13. A system for communicating information between an information handling system and a digital peripheral device of the information handling system, comprising:
    means for executing instructions on the information handling system, said executing means being coupled to means for carrying information provided by said executing means;
    means, coupled to said information carrying means, for receiving the information and for sending the information to the a digital peripheral device according to a first digital communications standard; and
    means, coupled to said information carrying means via said information receiving means, for converting the information from the first digital communications standard to a second digital communications standard and for transmitting the information to the digital peripheral device as an digital signal in accordance with the second digital communications standard, the second digital communications standard being interpretable by the digital peripheral device,
    the digital peripheral device being a legacy device having a manufacturer specific infrared control code.

14. A system as claimed in claim 13, said information converting means comprising an infrared controller.

15. A system as claimed in claim 13, said information converting means comprising a means having a serial port interface for generating control information for the peripheral device, and means, coupled to said generating means, for transmitting the control information to the peripheral device.

16. A system as claimed in claim 15, the serial port interface being in compliance with RS-232 standards.

17. A system as claimed in claim 13, the first digital communications standard being a serial communications standard.

18. A system as claimed in claim 17, the serial communications standard being in compliance with an RS-232 standard.

19. A system as claimed in claim 13, the second digital communications standard being an infrared communications standard.

20. A system as claimed in claim 13, the second digital communications standard being a radio frequency standard.

21. A system as claimed in claim 13, said receiving means being a USB controller.

22. A system as claimed in claim 13, the first digital communications standard being in compliance with a USB standard.

23. A system as claimed in claim 13, said information converting means comprising means having a serial communications interface for generating control information for the peripheral device, means, coupled between said receiving means and said control information generating means, for converting the information from the first digital communications standard to the second digital communications standard, and means, coupled to said control information generating means, for transmitting the control information to the peripheral device according to the second digital communication standard.

24. A system as claimed in claim 23, said information receiving means being a USB controller, the serial communications interface of said microcontroller being in compliance with RS-232 standards, and said means for converting being a USB to RS-232 converter.

25. In an information handling system, a method for communicating with a peripheral device with a first communication standard wherein the peripheral device interprets information according to a second communication standard differing from the first communications standard, comprising:
   generating control information for controlling the peripheral device;
   sending control information to a peripheral device controller according to a first digital communications standard;
   converting the control information from the first digital communication standard to the second digital communication standard with a converter in the digital peripheral device controller that converts a signal in the first digital communication standard to a signal in the second digital communication standard, the control information in the second communication standard being interpretable by the peripheral device; and
   transmitting the converted control information to the peripheral device as a digital signal according to the second digital communication standard whereby the peripheral device receives and interprets the control information and executes a control function in response thereto,
   wherein said transmitting step comprising the step of transmitting the converted control signal to the peripheral device as an infrared signal,
   the peripheral device being a legacy device having a manufacturer specific control code.

26. A method as claimed in claim 25, the second digital communications standard being in compliance with an RS-232 standard.

27. A method as claimed in claim 25, the first digital communications standard being in compliance with a USB standard.

28. A computer readable medium readable by an information handling system whose contents cause the information handling system to execute steps for communicating with a peripheral device with a first digital communication standard wherein the peripheral device interprets information according to a second digital communication standard differing from the first digital communications standard, the steps comprising:
   generating control information for controlling the peripheral device;
   send the control information to a digital peripheral device controller according to a first digital communications standard;
   converting the control information from the first digital communication standard to the second digital communication standard with a converter in the peripheral device controller that converts a signal in the first digital communication standard to a signal in the second digital communication standard, the control information in the second communication standard being interpretable by the peripheral device; and
   transmitting the converted control information to the peripheral device a digital signal according to the second digital communication standard whereby the peripheral device receives and interprets the control information and executes a control function in response thereto,
   wherein said transmitting step comprising the step of transmitting the converted control information to the peripheral device as an infrared signal,
   the peripheral device being a legacy device having a manufacturer specific control code.

29. A computer readable medium as claimed in claim 28, the second digital communications standard being in compliance with an RS-232 standard.

30. A computer readable medium as claimed in claim 28, the first digital communications standard being in compliance with a USB standard.

31. An apparatus, comprising:
   a USB controller for controlling for communicating with devices using USB formatted signals;
   a USB to RS-232 converter coupled with said USB controller for converting USB formatted signals from said USB controller to RS-232 formatted signals such that said USB controller is capable of communicating with an RS-232 peripheral device; and
   a wireless communication transducer coupled to said USB to RS-232 converter for wirelessly communicating with the peripheral device,
   the peripheral device being a legacy device having a manufacturer specific control code.

32. A system for communicating information between an information handling system and a peripheral device of the information handling system, comprising:
   a processor for executing instructions on the information handling system, said processor being coupled to a bus for carrying information provided by said processor;
   a host controller coupled to said bus for receiving the information and for sending the information to the peripheral device according to a first digital communications standard; and
   a peripheral device controller coupled to the bus via said host controller for converting the information from the first digital communications standard to a second digital communications standard and for transmitting the information to the peripheral device as an analog signal in accordance with the second digital communications standard,
   wherein one of the first and second digital communications standard is a USB standard, an other of the first and second digital communications standard is an RS 232 standard, and the analog signal is either an rf signal or an infrared signal,
   the peripheral device being a legacy device having a manufacturer specific control code.

33. A system according to claim 32, wherein the peripheral device controller comprises a converter which converts the information from the first digital communications standard to a second digital communications standard.

34. A system according to claim 33, wherein the converter is implemented as a hardware device having specific circuitry designed to implement the conversion function.

35. A system according to claim 33, wherein the converter is implemented as a software routine stored in read only memory.

36. A system according to claim 33, wherein the converter is implemented as a software program.

37. A system according to claim 32, wherein the first digital communications standard is a USB standard.

38. A system according to claim 33, wherein the legacy device is one of the group consisting of a VCR, an audio amplifier, a laser disc player, and a DVD player.

39. A system according to claim 33, wherein the peripheral device controller further comprises a microcontroller with an interface to receive the information in the second digital communications standard from the converter.

40. A system according to claim 39, wherein the microcontroller outputs control code to an infrared diode transmitter.

41. A system for communicating information between an information handling system and a peripheral device of the information handling system, comprising:

a processor for executing instructions on the information handling system, said processor being coupled to a bus for carrying information provided by said processor;

a host controller coupled to said bus for receiving the information and for sending the information to the peripheral device according to a first digital communications standard; and a peripheral device controller coupled to the bus via said host controller for converting the information from the first digital communications standard to a second digital communications standard and for transmitting the information to the peripheral device as an analog signal in accordance with the second digital communications standard, wherein the first digital communications standard is a USB standard, the second digital communications standard is an RS-232 standard, the analog signal is either an rf signal or an infrared signal, the peripheral device is a legacy device and the analog signal transmits a manufacturer specific control code, wherein the peripheral device controller comprises a converter which converts the information from the first digital communications standard to a second digital communications standard, wherein the converter is implemented as a hardware device having specific circuitry designed to implement the conversion function, as a software routine stored in read only memory, or as a software program, wherein the peripheral device controller further comprises a microcontroller with an interface to receive the information in the second digital communications standard from the converter, the microcontroller outputting to a transducer.

42. A system according to claim 41, wherein the legacy device is one of the group consisting of a VCR, an audio amplifier, a laser disc player, and a DVD player.

43. The system of claim 42, wherein the manufacturer specific control code is either a REC-80 IR control or a RC-5 code.

* * * * *